Patented Nov. 22, 1938

2,137,823

UNITED STATES PATENT OFFICE 2,137,823

PURIFYING RAW WOOL

Joseph Nuesslein and Jürgen von Klenck, Frankfort-on-the-Main, Germany, assignors to I. G. Farbenindustrie Aktiengesellschaft, Frankfort-on-the-Main, Germany No Drawing. Application November 18, 1936, Serial No. 111,560. In Germany November 22, 1935

9 Claims. (Cl. 8—139)

Raw wool as obtained from the sheep contains an amount of impurities which must be removed before the wool can further be treated. For this purpose there are several processes; in one of these the wool is exposed to the action of alkali soap solutions at a raised temperature. By this process the wool fat contained in the wool is saponified or emulsified; at the same time a great deal of the dirt which adheres to the wool is removed. Burs or other vegetable matters are in most cases not removed by this process or are removed only to an incomplete extent. A further disadvantage of this process is the fact that the wool is easily damaged by the alkaline treatment; furthermore, in the aqueous medium a more or less strong felting occurs. Instead of soap, soap substitutes of various chemical composition are used, the effect of which is much the same.

In an endeavour to avoid the above disadvantages, the wool has been washed in organic solvents. This process is expensive on account of the unavoidable loss of solvents and is therefore used only to a limited extent; furthermore, it eliminates only a small part of the mechanical impurities such as sand, clay, iron oxide, and so on. Thus for the complete purification of the wool a further wet treatment is still necessary so that the advantages involved in washing by solvents are lost again.

Proposals have recently been made to cool the raw wool to temperatures of about —40° C. At this temperature the wool fat becomes brittle and the vegetable impurities become hard so that both may be beaten out. The costs of this process are very high; besides, the wool fat is not sufficiently removed so that in every case a wet washing must still be carried out.

By the process of this invention, improved or even new effects in wool-washing may be attained by first treating the wool if necessary at a raised temperature, with a molten or liquid organic body which is able to dissolve wool fat, then removing the excess of the organic body, cooling the wool below the melting point of the organic body, and finally freeing it mechanically from the still adherent organic body and simultaneously from the greater part of its impurities.

For the treatment there may be used, in the first place, organic bodies melting between 50° C. and 100° C. Since they must be used in the molten state, the temperatures at which the wool is treated will lie somewhat below or above 100° C., for instance between 85° C. and 115° C. These temperatures do not at all affect the wool whereas it must be feared that at an essentially higher temperature the wool would be decomposed. In the case of bodies whose melting points lie within the above limits the mechanical treatment may be performed at ordinary temperature so that no new special machines are needed. Only such bodies may be used which do not detrimentally affect the wool at the temperature of the treatment. There may advantageously be used hydrocarbons or halogenated hydrocarbons, but the invention is not limited to these compounds. Compounds which damage the wool fiber, for instance, phenol may not be used.

It is also possible to treat the wool by immersion at ordinary temperature, provided that there is chosen an organic body which is liquid at this temperature. The subsequent mechanical treatment of the wool is then conducted at a temperature below the melting point of the organic body used and, if necessary, must therefore be performed with cooling.

The first phase of this treatment may be carried out by dipping, spraying or by a similar suitable method and if desired in several stages. The greater part of the wool fat dissolves and simultaneously the wool is freed from the greater part of the dirt and sand; in this operation high temperatures, in contrast with the washing with solvents of low boiling point, are especially serviceable. The wool is then freed from the loosely adhering solvent, for instance, by centrifuging, filtering with suction or squeezing and then cooled below the melting point of the organic body used, the latter thereby solidifying.

The wool is then treated on a suitable machine, for instance a beater or a carding machine. By the mechanical action to which the wool is thereby subjected, the organic body, which has become hard or brittle, falls out together with wool fat dissolved in it. Also the vegetable dirt is freely removed. After this treatment the wool leaves the machine with an improved appearance and a soft feel, open and clean.

As the wool has not come into touch with aqueous media it is not at all felted. Also, all possibility of damage by alkali is excluded. The length of staple is completely maintained so that, for instance, the yield of slubbing in worsted wool increases. As the vapour pressures of the preferred organic bodies are much below those of the solvents of low boiling point hitherto used, such as trichlorethylene, carbon tetrachloride benzine and others, the loss of treating agent by evaporation is much reduced and inconvenience in the workshops is avoided.

The organic body which has been used in the process and has been removed during the treatment which is, if desired, carried out at an elevated temperature, by centrifuging and mechanical cold treatment, may be recovered in a simple and convenient manner by melting and filtering and distilling and be returned to the process. Suitable organic bodies for the invention are, for instance, naphthalene, para-dichlorobenzene, monochloro- and dichloronaphthalenes. Instead of single bodies also mixtures may be used; furthermore, bodies active in lowering surface tension, such as fatty acids or their metal salts, may be added. As additions there may also be used soap substitutes, fatty acid sulfonates, triethanolamine soaps and similar bodies.

The following examples illustrate the invention:

(1) 10 kilos of greasy wool are treated, while gently agitating, for two minutes in a vessel containing 75 kilos of melted naphthalene and are then centrifuged in a centrifuge which has been pre-heated to about 100° C. After cooling, the centrifuged wool may at once be put through a carding machine where the remaining part of the naphthalene, containing wool fat, and the greater part of all vegetable and mineral dirt is removed. After two passages through the card, a withdrawn fleece will show a content of fat of 0.64 per cent. and only traces of naphthalene. The wool has a loose and soft feel and is not at all felted. If desired, the colour of the wool may be brightened in a backwasher.

(2) 10 kilos of greasy wool are treated in 60 kilos of liquid para-dichlorobenzene for 5 minutes as described in Example 1; after carding, the wool has a content of fat of 0.51 per cent; it is open and has a soft and loose feel.

(3) 10 kilos of greasy wool are treated in 70 kilos of melted-β-chloronaphthalene as described in Example 1. The cleansing effect is the same as in the preceding example.

(4) 10 kilos of greasy wool are treated in 75 kilos of benzene at ordinary temperature. After centrifuging, the wool is cooled to a temperature of some degrees below 0° C.; at this temperature the wool is treated as described in Example 1.

(5) 10 kilos of greasy wool are treated as described in Example 1, 0.5 kilo of magnesium oleate having previously been added to the naphthalene.

We claim:

1. The process of purifying raw wool which comprises treating the wool with a compound able to dissolve wool fat selected from the group consisting of hydrocarbons and halogenated hydrocarbons in the liquid state, removing the excess of the organic body, cooling the wool until the organic body solidifies and then detaching by a mechanical treatment the solidified organic compound from the wool simultaneously with the greater part of the impurities contained in the wool.

2. The process of purifying raw wool which comprises treating the wool with a compound able to dissolve wool fat selected from the group consisting of hydrocarbons and halogenated hydrocarbons liquefied by melting, removing the excess of the organic body, cooling the wool until the organic body solidifies and then detaching by a mechanical treatment the solidified organic compound from the wool simultaneously with the greater part of the impurities contained in the wool.

3. The process of purifying raw wool which comprises treating the wool with a compound able to dissolve wool fat selected from the group consisting of hydrocarbons and halogenated hydrocarbons liquefied by melting, in the presence of a substance having capacity for diminishing surface tension, removing the excess of the organic body, cooling the wool until the organic body solidifies and then detaching by a mechanical treatment the solidified organic compound from the wool simultaneously with the greater part of the impurities contained in the wool.

4. The process of purifying raw wool which comprises treating the wool with a compound able to dissolve wool fat selected from the group consisting of hydrocarbons and halogenated hydrocarbons melting between 50° C. and 100° C., liquefied by melting, in the presence of a substance having capacity for diminishing surface tension, removing the excess of the organic body, cooling the wool until the organic body solidifies and then detaching by a mechanical treatment the solidified organic compound from the wool simultaneously with the greater part of the impurities contained in the wool.

5. The process of purifying raw wool which comprises treating the wool at a temperature between 85° and 115° C. with a liquid compound capable of dissolving wool-fat of the group consisting of hydrocarbons and halogenated hydrocarbons having a melting point between 50° C. and 100° C., removing the excess of the organic body, cooling the wool until the liquid organic body solidifies and then detaching by a mechanical treatment the solidified organic compound from the wool simultaneously with the greater part of the impurities contained in the wool.

6. The process of purifying raw wool which comprises treating the wool at a temperature of between 85° C. and 115° C. in the presence of a substance having capacity for diminishing surface tension with a liquid compound capable of dissolving wool-fat of the group consisting of hydrocarbons and halogenated hydrocarbons having a melting point between 50° C. and 100° C., removing the excess of the organic body, cooling the wool until the liquid organic body solidifies and then detaching by a mechanical treatment the solidified organic compound from the wool simultaneously with the greater part of the impurities contained in the wool.

7. The process of purifying raw wool which comprises treating the wool with molten naphthalene, centrifuging, cooling the wool until the naphthalene solidifies and then detaching by a mechanical treatment the solidified naphthalene from the wool simultaneously with the greater part of the impurities contained in the wool.

8. The process of purifying raw wool which comprises treating the wool with molten para-dichlorobenzene, centrifuging, cooling the wool until the para-dichlorobenzene solidifies and then detaching by a mechanical treatment the solidified para-dichlorobenzene from the wool simultaneously with the greater part of the impurities contained in the wool.

9. The process of purifying raw wool which comprises treating the wool with molten beta-chloronaphthalene, centrifuging, cooling the wool until the beta-chloronaphthalene solidifies and then detaching by a mechanical treatment the solidified beta-chloronaphthalene from the wool simultaneously with the greater part of the impurities contained in the wool.

JOSEPH NUESSLEIN.
JÜRGEN von KLENCK.